COMMINUTED CELLULOSE MATERIAL

ADMIX WITH AT LEAST ABOUT 10%, PREFERABLY BETWEEN ABOUT 10% AND ABOUT 40% BY WEIGHT THERMOPLASTIC BINDER

MOLDING MIXTURE

FELT INTO PRESELECTED SHAPE

SHAPED FELT

SUBJECT FELT TO HOT AQUEOUS VAPOR UNDER THE FOLLOWING CONDITIONS:

1. LIQUID WATER CONTENT OF VAPOR IS LESS THAN ABOUT 10% BY WEIGHT

2. TEMPERATURE OF FELT ADJUSTED BY CONTACT WITH THE VAPOR TO BETWEEN ABOUT 150° F. AND ABOUT 300° F., PREFERABLY BETWEEN ABOUT 200° F. AND ABOUT 250° F.

3. MOISTURE CONTENT OF FELT ADJUSTED BY CONTACT WITH THE VAPOR TO BETWEEN ABOUT 10% AND ABOUT 40%, PREFERABLY BETWEEN ABOUT 20% AND ABOUT 30% BY WEIGHT

CONDITIONED FELT

PRESS

MOLDED ARTICLE

INVENTOR.
James R. Roberts
BY
ATTY.

United States Patent Office 2,759,837
Patented Aug. 21, 1956

2,759,837
PROCESS OF FORMING MOLDED CELLULOSE PRODUCTS

James R. Roberts, Longview, Wash., assignor to Weyerhaeuser Timber Company, Tacoma, Wash., a corporation of Washington Application October 13, 1952, Serial No. 314,554

12 Claims. (Cl. 106—200)

The present invention relates to a process of forming molded mixtures of comminuted or defiberized cellulose material and thermoplastic binders with controlled humidification of the mixtures prior to their final consolidation.

In the art of consolidating defiberized cellulose materials admixed with binders it is well known to provide molding mixtures containing a large proportion of costly binder together with a cellulose filler. Such compositions are characterized by the ability to flow freely and to be consolidated upon the application of heat and pressure, conforming to the contour of the mold in which they are placed. Successful use of these conventional molding compositions, however, is attended by the disadvantage that the inexpensive cellulose filler may not be employed in major proportions. If too much is used, the molded product is deficient in strength, has poor surface qualities in that the surface is of non-uniform color, does not have a mirror finish, and has present on the surface loosely bound fibers which rub off upon handling the molded article.

It also is well known in the art of consolidating defiberized cellulose mixtures to provide such mixtures comprising a preponderant amount of cellulose fiber with a very small amount of binder and to subject the mixture to the action of heat and pressure. This procedure is employed in the fabrication of hardboard and related products. It differs from the molding procedure described above in that the primary action occurring during the hot pressing operation is the consolidation of the fibers and their adhesion to each other to form a hard final product of substantial density. Although such products have the advantage of being low in cost, the compositions from which they are made are not useful as molding compositions.

It therefore is the general object of the present invention to provide a process of treating comminuted cellulose material so that it may be employed as the primary constituent of moldable compositions, thereby filling the void between the expensive, conventional, plastic molding compositions containing a high proportion of binder, and the inexpensive but non-plastic compositions employed in hardboard manufacture. There thus is provided a new class of molding compositions which are very low in cost, but which are useful in the fabrication of a diversity of contoured, high-strength, molded articles such as chair backs, arm rests, and other constituent parts of furniture; trays; brush handles; containers; cases for ammunition, and the like.

Other objects of the present invention are to provide a process for producing compositions comprising predominantly defiberized cellulose materials, which compositions are First: Characterized by the property of plastic flow;
Second: Readily moldable into articles of high strength;
Third: Readily moldable into articles having desirable surface properties;
Fourth: Readily moldable into complex shapes;
Fifth: Readily moldable into articles of superior water resistance;
Sixth: Readily moldable without sticking to the mold;
Seventh: Rapidly moldable by a cold stamping operation;
Eighth: Readily moldable even though a low-cost whole wood fiber is employed as the major constituent;
Ninth: Readily feltable even though they contain a substantial quantity of binder;
Tenth: Readily moldable without the cellulose constituent having been subjected to a plasticizing treatment, as by incorporation of furfural, formaldehyde, aniline and the like; and
Eleventh: Readily moldable into articles of substantial size.

As is apparent from a consideration of the drawings comprising a flow plan illustrating the presently described process, the present invention is based upon the discovery that although a mixture of a predominant amount of comminuted cellulose material and a minor proportion of the conventional thermoplastic binders cannot be molded satisfactorily for the reasons given hereinabove, such a mixture may be transformed into a molding composition of great utility by subjecting it prior to its final consolidation to the action of a hot aqueous vapor, such as steam, under carefully controlled and critical conditions.

When this is done, such mixtures may be used in the manufacture of articles which in their final shape are contoured differently or more severely than the felted preforms from which they were pressed. This is because the woody components of the mixture are conditioned so that they will slip past one another in different amounts in order to produce the final contouring. The mixtures then may be applied in the manufacture from flat mats of such objects as rectangular trays with sides firmly secured at the corners. Also, objects of more complex contour may be prepared such as vases and ash trays, parts of which have a radius of curvature of as low as 8 mm.

Thus a preferred embodiment of the present invention comprises providing a quantity of comminuted cellulose material, preferably defiberized lignocellulose. This is mixed with at least about 10%, preferably between about 10% and about 40%, by weight of thermoplastic binder. The resulting molding mixture then is felted into a preselected shape and the resulting felt, which has a density of less than about 20 pounds per cubic foot, subjected to the action of steam or other hot aqueous vapor.

The conditioning treatment is carried out using aqueous vapor having a liquid water content, e. g. a content of condensed steam, of less than about 10% by weight. It is continued until the temperature of the felt has been adjusted to a value of between about 150° F. and about 300° F., preferably between about 200° F. and about 250° F. Also, it is continued until the moisture content of the felt has been adjusted by condensation and sorption processes to a level of between about 10% and about 40%, preferably between about 20% and about 30% by weight. The resulting conditioned felt then is pressed, with or without a preliminary prepressing operation, to form the finished molded article.

A variety of comminuted cellulose materials may be used as starting materials in the practice of the present invention. Although suitable materials include sawdust, shavings, wood flour, and the various chemically produced cellulose pulps, it is preferred to employ defiberized lignocellulose. This may be derived from any suitable source such as cane, straw, the bark of trees, and the like, but preferably is derived from the wood of trees of various species.

The wood may be reduced to the form of small particles by a variety of instrumentalities, as by means of grinders or knives, or by means of machines such as the MacMillan defibrator, the Bauer defibrator, or the Allis-Chalmers defibrator, which have as their function the reduction of wood to fibrous form. A preferred means of reducing the wood for the purpose of the present invention, however, is by means of the Asplund defibrator. In this device the wood is subjected to a preliminary treatment with steam at a pressure of between about 80 and about 160 p. s. i. g. for a time of from about one-half to about six minutes, thereby softening the lignin. While in this steam environment the wood is subjected to a rubbing, abrading action between metal discs. This reduces the softened wood to fibers having a size distribution determined by the adjustment of the discs. The resulting fiber then is discharged to the atmosphere.

The foregoing procedure produces the so-called Asplund fiber which is peculiarly adaptable for the present purposes for a variety of reasons. In the first place, Asplund fiber is of relatively small, uniform particle size containing a high percentage of feltable fibers or flexible, feltable fiber bundles. Secondly, it contains a minimum amount of massive particles which interfere with the production of a satisfactory felt. Thirdly, it contains all of the natural bonding agents present in whole wood, which leads to the production of a strong molded article with introduction of a minimum amount of extraneous binder.

Fourth, the Asplund fiber is fluffy and non-coherent so that it may be easily packaged and transported. Fifth, it is obtained in high yield without waste of the raw wood starting material. Sixth, the character of the Asplund defiberator and process is such that thermoplastic binders may be introduced directly into the machine without first being emulsified or dissolved in a solvent.

This simplifies the binder-applying procedure and eliminates the necessity of providing special equipment for binder application and solvent recovery. It also applies the binder more effectively since it is applied in a softened condition to wood fibers which have been rendered soft and permeable so that even hydrophobic binders may be incorporated efficiently in or on the fibers. Also, by controlling the conditions of introduction, the degree of penetration of the binder may be controlled. All of these features of the Asplund process and the fiber which it produces are reflected in the provision of a non-coherent, readily feltable mixture of fiber and binder which is ideally suited for the purposes of the present invention.

The thermoplastic binders as a class used singly or in admixture with each other are suitable for the purposes of the present invention, the particular binder employed being determined by the properties of strength, hardness, surface qualities, etc. desired in the molded product. Such materials include, for example, the various grades of asphalt and gilsonite; the thermoplastic cellulose ethers, including ethyl cellulose, benzyl cellulose and the like; the thermoplastic cellulose esters, such as cellulose acetate; the thermoplastic coumarone resins; the thermoplastic coumarone-indene resins; the thermoplastic polyvinyl resins, including polyvinyl acetate, polyvinyl chloride and copolymers thereof; the thermoplastic alkyd resins; the thermoplastic polystyrenes; and rosin. Also suitable are those resinous condensation products of urea and an aldehyde and of a phenol and an aldehyde, for example, the phenol-formaldehyde resins, which at least in the preliminary stages of the pressing operation are thermoplastic in properties.

Particularly well suited is the extracted pine wood pitch product described in Perry U. S. 2,503,407 and sold under the trade name "Vinsol" resin. This is a by-product of the production of wood rosin from pine wood, being the residue remaining after removal of the turpentine by distillation and of the rosin by solvent extraction with a hydrocarbon solvent such as gasoline.

The relative proportions of thermoplastic binder and cellulose base material may be varied within limits to suit the particular character of the composition and its contemplated use. In general, however, a sufficient amount of binder should be employed to impart thermoplastic properties to the mixture so that when the latter is molded hot, the cellulose particles will be lubricated by the softened binder with the result that plastic flow, or at least fiber slippage occurs, enabling filling of the mold. This lower limit is about 10% by weight based on the dry weight of the molding composition. It clearly distinguishes the molding compositions which are the subject matter of the present invention from the hardboard-fabricating compositions which are not characterized by plastic flow, the binder serving a bonding function only, and containing only a small amount of binder, usually less than about 5% by weight.

The upper limit of binder usage for the purposes of this invention is determined largely by the character of the binder employed and also by practical considerations limiting the use of this relatively costly constituent. Thus the upper limit comprises the amount required for maximum lubrication and void filling without reduction of the strength-enhancing intertwining of the fibers through dilution of the fiber mixture with binder. In practice this amount is about 40% by weight, although in particular applications it may be desirable or necessary to include a larger proportion of binder.

The binder may be applied to the cellulose component of the molding mixtures described herein in a variety of suitable manners. Where the cellulose material is provided initially in the form of wood chips, the binder may be applied thereto prior to their reduction to fiber or particle form, or contemporaneously with the reducing operation. In this manner the binder is distributed throughout the mass by the means used for reducing the wood.

When, as is preferred, the Asplund defibrator is used as a wood reducing mechanism the binder may be incorporated in the mixture to good advantage by adding it to the Asplund machine immediately ahead of or just behind the defibrating discs. Since the binder softens in the steam environment of the Asplund machine, particularly effective admixing with the cellulose fiber product is obtained.

If desirable or necessary, however, a certain proportion of the binder may be added to the cellulose material after the reduction of the latter to fibers or small pieces. In such a case the binder may be sprayed hot on the fibers and mixed with the latter, or mixed in solid form with the fibers by vigorous agitation to secure uniform distribution of the binder throughout the mass.

As a result of the foregoing procedure there is obtained a molding mixture which is ready for shaping or felting into a desired shape. This may be accomplished, for example, by a wet felting technique in which the fibrous mixture is suspended in a relatively large proportion of water to form a slurry which is transferred to a screen. Upon draining off of the water there remains a wet lap which then may be dried to form a dry mat suitable for further processing in accordance with the procedure herein disclosed.

Alternatively and preferably, however, the fibrous mixture may be formed into a felt or mat by a suitable dry- or moist-felting technique. Thus the material may be preformed into the desired shape in a felting jig provided with appropriately located screens to direct its placement and to permit the escape of air. In such a procedure, a weighed quantity of the material may be introduced into a high-speed, paddle type fan capable of producing the air pressure required by the design and volume of the preform to be made. It then may be blown or sucked into the forming jig to produce the desired preform or felt. The latter, whether prepared by a wet-felting procedure followed by a drying operation, or by a dry or moist felting procedure will have a density of not more than about 20 pounds per cubic foot. As a result, it will have an open structure which is permeable to steam, thereby rendering it suitable for processing in the steaming operation which follows.

The preform then is subjected to a preliminary treatment with a hot aqueous vapor to prepare it for the final pressing step. Steam and humidified hot air are preferred hot aqueous vapors. When steam is employed, it may be either saturated, unsaturated, or superheated. It will be understood, however, that where saturated steam is used under non-equilibrium conditions it may have an entrained moisture content which may not be over a critical level of about 10% by weight, as is developed more fully below. Although steam and humidified hot air thus are preferred hot aqueous vapors, vapors such as humidified nitrogen, humidified carbon dioxide, humidified flue gases and the like also may be employed.

The conditions under which the preform is conditioned by contact with steam or other hot aqueous vapors are critical to the success of the presently described procedure. Factors which must be controlled carefully are the liquid water content of the vapor, the temperature to which the preform or felt is elevated by contact with the vapor and the moisture content imparted to the felt by the vapor.

As to the liquid water content of the vapor, this must be kept at a level of below about 10% by weight. If more than this amount of condensed water vapor is present, the heating of the felt is accomplished inefficiently since the amount of heat imparted thereto by hot water is small as compared with the heat imparted by the condensation of water vapor or steam. Also, if too much water is present, the pressing operation is prolonged and complicated because time is required to vaporize the excess water, which tends to explode and form blisters in the product. Still further, where an excessive amount of liquid water is present, it is not possible to obtain the required uniform heating and uniform humidification of the felt.

As to the temperature to which the felt is elevated, this should be sufficient to soften the binder and plasticize the mixture. It must be insufficient, however, to advance or precure any thermosetting binder which may be present; to volatilize the binder; or to scorch or degrade either the cellulose material or the binder. The temperature to which the felt must be heated to avoid the foregoing difficulties thus lies within the broad range of between about 150° F. and about 300° F., although a range of between about 200° F. and about 250° F. is preferred.

The treatment with hot aqueous vapor at a temperature of above about 150° F. should be continued until a uniform moisture content of at least 10% has been imparted to the felt by condensation, sorption or permeation processes. This is the lower limiting value at which the advantages noted herein of such a treatment are obtained. However, if more than about 40% moisture is introduced into the felt, the disadvantages ensue which have been noted above in connection with the introduction of liquid water into the felt. These include, for example, a prolonged press time; difficulty with steam explosions, blowing and blistering; sticking to the mold, etc. A preferred moisture content to which the felt is adjusted lies between about 20% and about 30% by weight.

Numerous significant advantages stem from humidifying the felt in the manner indicated above. First, it prevents the drying of the cellulose material and humidifies it to an optimum extent, making it, as well as the binder, plastic in character. This factor is reflected in improved strength of the molded article as well as in a reduction of its tendency to delaminate. This is because the cellulose fibers are crimped and bonded during pressing while they are in a flexible condition. As a result they are interlocked and cannot spring back after the molded article is removed from the press as would be the case if they were pressed dry. It is this factor which is largely determinative of the applicability in the instant process of low cost whole wood Asplund fibers as the major constituent of the molding composition.

The humidifying treatment also prevents drying of the surface of the felt during pressing such as otherwise would occur during loading and closing of the press, the platens of which are hot and tend to dry out the surface of the felt prior to pressing. As a result, the fibers will not rub off the surface of the molded article as they otherwise are prone to do, and the surface has a mirror finish.

Still a further important advantage attending the inclusion of the humidifying step in the instant process is the fact that many cellulose containing materials contain substantial amounts of water soluble constituents. These have binding properties per se. During the humidifying treatment they are dissolved and spread upon the surface of the cellulose particles where they are effective bonding agents, thereby improving the strength of the product.

In addition to the foregoing, there are numerous other advantages which follow when the felt is humidified in the manner disclosed herein. Thus the increased plasticity of the mass permits greater densification. Less pressure is required in the press for its consolidation. The plastic mixture conforms to molds of complex contour. Also, and of very great importance, is the fact that the humidification places the felt in condition for stamp pressing in an unheated press, the press dwell time being a matter of five or six seconds, as opposed to a time of several minutes which otherwise would be required.

The final step in the hereindescribed process comprises pressing the humidified felt, thereby consolidating it to the desired contour and density. As noted above this may be accomplished with or without a prepressing operation in either heated or unheated presses. In general, a prepressing operation is employed when it is desirable or necessary to partially compress the mat or felt to render it self sustaining and handleable, thereby facilitating its introduction into the mold for the final pressing operation. The prepressing step may be carried out in presses of conventional construction, either heated or unheated.

When an unheated press is employed either for the prepressing step or the final pressing step, it will be apparent that the heat stored in the humidified felt will be sufficient for accomplishing the molding operation and for at least partial drying of the product. Furthermore, even though the press is not supplied with an extraneous source of heat, it will be warmed by continued contact with successive charges of hot felts and the heat stored in this manner will further facilitate the pressing operation. Still further, where the pressing operation in an unheated press does not dry out the felt to the desired extent, this may be accomplished after pressing by air drying in an oven of suitable design.

Where a heated press is employed the press dwell time, the pressing pressure and the pressing temperature are dependent upon the properties of the molding mixture, the thickness of the felt, the complexity of the mold, etc. In general, however, where a heated mold is employed it may be used at a temperature of between about 200° F. and about 400° F. Pressing pressures suitably may be within the broad range of between about 100 p. s. i. and about 2000 p. s. i. depending upon the temperature, the thickness of the felt and the desired density. Press dwell times vary from a few seconds, for a cold stamping operation as described above, to as much as five minutes or more for a thick, high density, glazed product.

The process of the present invention is illustrated in the following examples, wherein parts are expressed as parts by weight.

*Example 1*

Molded paint brush handles were made by defiberizing wood in an Asplund defibrator, 30% Vinsol resin being added in the preheating chamber of the machine. The resulting mixture of whole wood fibers had a uniform content of resin and was in the form of a dry, fluffy, non-coherent, readily feltable mass. It was introduced in weighed charges into a paddle type fan, and blown into a form of appropriate shape and dimensions.

The felted mixture while still in the form was subjected at atmospheric pressure to the action of steam, having a liquid water content of less than about 10% by weight. The steam treatment was continued until the moisture content of the felt had been adjusted by the processes of condensation and sorption to a value of about 30% by weight and the temperature to a value of about 270° F. The humidified felt then was introduced into a press, heated to 350° F. and pressed at 275 p. s. i. for about 30 seconds. The resulting handles had good surface characteristics, a density of 80 pounds per cubic foot, and a rupture modulus of 9,000 pounds per square inch.

In a control experiment, the foregoing procedure was carried out omitting the steaming step. The resulting pressed handles were of unsatisfactory qualities, being cracked, poorly densified, and characterized by a rough surface having loose fibers which were easily rubbed off.

*Example II*

This example illustrates the applicability of the presently described process to the preparation of molding compositions adaptable for consolidation by a cold stamping operation.

A quantity of defiberized lignocellulose admixed with a binder comprising 35% extracted pine wood pitch and 5% rubber latex was blown into a mold in the shape of an automobile arm rest base. The resulting felted form then was subjected to the action of saturated steam having a liquid water content of less than 10% by weight under the following conditions:

| | |
|---|---|
| Steam pressure_____p. s. i. g__ | 40 |
| Steam temperature_____°F__ | 288 |
| Steaming duration_____seconds__ | 10 |
| Final felt temperature_____°F__ | 200 |
| Final felt moisture content_____percent__ | 30 |

The resulting conditioned felt was transferred promptly to an unheated press and stamp pressed for 15 seconds. As a result there was produced an arm rest having a uniformly smooth glazed surface and a rupture modulus of 8500 p. s. i.

*Example III*

This example illustrates the applicability of the process of the present invention under different conditions than those employed in the procedure of Example I.

A mixture comprising 70% defiberized wood and 30% extracted pine wood pitch was dry felted into the form of a container for army rockets. The form then was steamed using steam having a liquid water content of less than about 10% under the following conditions:

| | |
|---|---|
| Steam pressure_____p. s. i. g. (atmospheric)__ | 0 |
| Steam temperature_____°F__ | 212 |
| Steam duration_____seconds__ | 60 |
| Final felt temperature_____°F__ | 200 |
| Final felt moisture content_____percent__ | 15 |

The above felt was pressed in a press heated to a temperature of 250–260° F. for a time of 120 seconds. The resulting container had a surface which was satisfactory in all respects and a rupture modulus of 9000 p. s. i.

*Example IV*

This example illustrates the application of the presently described process to molding compositions comprising defiberized lignocellulose material and a binder comprising a phenolaldehyde resin.

Light weight printing blocks having a honeycomb design on the back side thereof were prepared by introducing about 3% by weight thermosetting phenol formaldehyde resin into an Asplund defibrator. The resulting mixture of resin and fiber then was felted pneumatically into a flat mat having a density of about 4 pounds per cubic foot. The mat was steamed for 10 seconds at 212° F. and atmospheric pressure. This adjusted the temperature of the mat to a value of 180° F. and its moisture content to a value of about 20% by weight.

The steamed mat then was immediately prepressed in a flat mold to render it self sustaining. Thereafter it was transferred to a heated mold of honeycomb design and maintained at about 350° F. The mat was pressed in this mold for a period of about 2.5 minutes. This formed the final printing block which was ⅞ inch thick, had a density of 60 pounds per cubic foot and a smooth, hard, abrasion-resistant surface of good dimensional stability.

In a manner similar to that set forth in Examples I, II, III and IV molded objects of complex contour may be prepared using humidified hot air in place of the steam employed in the examples, the humidified hot air being at a temperature, for example, of between about 200° F. and about 400° F., and having a moisture content, for example, of between about 40% and about 80% by volume.

It thus will be apparent that by the present invention I have provided a process for the molding of rigid, strong, articles of complex contour. The articles may be of any desired density and of either thin or thick section. They may be fabricated from a wide variety of inexpensive molding compositions comprising a cellulose material as a principal constituent and a relatively minor proportion of a selected one of various species of low cost thermoplastic binders. These desirable results are obtained, furthermore, by rendering moldable for the first time mixtures which are predominantly wood not subjected to a preliminary cooking with a strong chemical reagent, which compositions may be sold at a substantially lower price than that commanded by the conventional molding compositions.

Having thus described my invention, what I claim as new and desire to protect by Letters Patent is:

1. The process of forming a molded product which comprises providing a moldable mixture comprising comminuted lignocellulose material and intimately admixed therewith at least about 10% of a thermoplastic binder, based on the dry weight of the mixture, forming the mixture into a felt of preselected shape, subjecting the felt to the action of an agent comprising aqueous vapor at a temperature of at least about 150° F. and having a liquid water content of less than about 10% by weight for a time sufficient to adjust the temperature of the felt to a value of between about 150° F. and about 300° F. and the moisture content of the felt uniformly to a value of between about 10% and about 40% by weight, thereby producing a conditioned felt of controlled temperature and moisture content, and immediately consolidating the conditioned felt to a predetermined density while utilizing the heat imparted to the felt by the heated vapor.

2. The process of claim 1 wherein the thermoplastic binder comprises extracted pine wood pitch.

3. The process of claim 1 wherein the thermoplastic binder comprises asphalt.

4. The process of forming a molded product which comprises providing a moldable mixture comprising comminuted lignocellulose material and intimately admixed therewith at least about 10% of a thermoplastic binder based on the dry weight of the mixture, forming the mixture into a felt of preselected shape, subjecting the felt to the action of an agent comprising aqueous vapor at a temperature of at least about 150° F. and having a liquid water content of less than about 10% by weight for a time sufficient to adjust the temperature of the felt to a value of between about 150° F. and about 300° F. and the moisture content of the felt uniformly to a value of between about 10% and about 40% by weight, thereby producing a conditioned felt of controlled temperature and moisture content, and immediately consolidating the conditioned felt to a predetermined density by the application of heat and pressure while utilizing the heat imparted to the felt by the heated vapor.

5. The process of forming a molded product which comprises providing a moldable mixture comprising comminuted lignocellulose material and intimately admixed therewith at least about 10% of a thermoplastic binder based on the dry weight of the mixture, forming the mixture into a felt of preselected shape, subjecting the felt to the action of an agent comprising hot aqueous vapor having a liquid water content of less than about 10% by weight for a time sufficient to adjust the temperature of the felt to a value of between about 200° F. and about 250° F. and the moisture content of the felt uniformly to a value of between about 10% and about 40% by weight, thereby producing a conditioned felt of controlled temperature and moisture content, and immediately consolidating the conditioned felt to a predetermined density while utilizing the heat imparted to the felt by the heated vapor.

6. The process of forming a molded product which comprises providing a moldable mixture comprising comminuted lignocellulose material and intimately admixed therewith at least about 10% of a thermoplastic binder based on the dry weight of the mixture, forming the mixture into a felt of preselected shape, subjecting the felt to the action of an agent comprising aqueous vapor at a temperature of at least about 150° F. and having a liquid water content of less than about 10% by weight for a time sufficient to adjust the temperature of the felt to a value of between about 150° F. and about 300° F. and the moisture content of the felt uniformly to a value of between about 20% and about 30% by weight, thereby producing a conditioned felt of controlled temperature and moisture content, and immediately consolidating the conditioned felt to a predetermined density while utilizing the heat imparted to the felt by the heated vapor.

7. The process of forming a molded product which comprises providing a moldable mixture comprising comminuted lignocellulose material and intimately admixed therewith at least about 10% of a thermoplastic binder based on the dry weight of the mixture, forming the mixture into a felt of preselected shape, subjecting the felt to the action of an agent comprising hot aqueous vapor having a liquid water content of less than about 10% by weight for a time sufficient to adjust the temperature of the felt to a value of between about 200° F. and about 250° F. and the moisture content of the felt uniformly to a value of between about 20% and about 30% by weight, thereby producing a conditioned felt of controlled temperature and moisture content, and immediately consolidating the conditioned felt to a predetermined density while utilizing the heat imparted to the felt by the heated vapor.

8. The process of forming a molded product which comprises providing a moldable mixture comprising comminuted lignocellulose material and intimately admixed therewith at least about 10% of a thermoplastic binder based on the dry weight of the mixture, forming the mixture into a felt of preselected shape having a density of not more than about 20 pounds per cubic foot, subjecting the felt to the action of an agent comprising aqueous vapor at a temperature of at least about 150° F. and having a liquid water content of less than about 10% by weight for a time sufficient to adjust the temperature of the felt to a value of between about 150° F. and about 300° F. and the moisture content of the felt uniformly to a value of between about 10% and about 40% by weight, thereby producing a conditioned felt of controlled temperature and moisture content, and immediately consolidating the conditioned felt to a predetermined density while utilizing the heat imparted to the felt by the heated vapor.

9. The process of forming a molded product which comprises providing a moldable mixture comprising comminuted lignocellulose material and intimately admixed therewith at least about 10% of a thermoplastic binder based on the dry weight of the mixture, forming the mixture into a felt of preselected shape, subjecting the felt to the action of steam having a liquid water content of less than about 10% by weight for a time sufficient to adjust the temperature of the felt to a value of between about 150° F. and about 300° F. and the moisture content of the felt uniformly to a value of between about 10% and about 40% by weight, thereby producing a conditioned felt of controlled temperature and moisture content, and immediately consolidating the conditioned felt to a predetermined density while utilizing the heat imparted to the felt by the steam.

10. The process of forming a molded product which comprises providing a moldable mixture comprising comminuted lignocellulose material and intimately admixed therewith at least about 10% of a thermoplastic binder based on the dry weight of the mixture, forming the mixture into a felt of preselected shape, subjecting the felt to the action of an agent comprising humidified hot air at a temperature of at least about 150° F. and having a liquid water content of less than about 10% by weight for a time sufficient to adjust the temperature of the felt to a value of between about 150° F. and about 300° F. and the moisture content of the felt uniformly to a value of between about 10% and about 40% by weight, thereby producing a conditioned felt of controlled temperature and moisture content, and immediately consolidating the conditioned felt to a predetermined density while utilizing the heat imparted to the felt by the humidified hot air.

11. The process of forming a molded product which comprises providing a moldable mixture comprising comminuted lignocellulose material and intimately admixed therewith from about 10% to about 40% by weight of a thermoplastic binder based on the dry weight of the mixture, forming the mixture into a felt of preselected shape, subjecting the felt to the action of an agent comprising aqueous vapor at a temperature of at least about 150° F. and having a liquid water content of less than about 10% by weight for a time sufficient to adjust the temperature of the felt to a value of between about 150° F. and about 300° F. and the moisture content of the felt uniformly to a value of between about 10% and 40% by weight, thereby producing a conditioned felt of controlled temperature and moisture content, and immediately consolidating the conditioned felt to a predetermined density while utilizing the heat imparted to the felt by the heated vapor.

12. The process of forming a molded product which comprises steaming pieces of wood at a pressure of between about 80 and about 160 p. s. i. g. for a time of between about ½ and about 6 minutes, and while maintaining the wood in the steam environment subjecting it to a rubbing, abrading action, thereby reducing it substantially to the form of ultimate fibers and flexible, feltable bundles of ultimate fibers, mixing the resulting fibrous product with at least about 10% of a thermoplastic binder based on the dry weight of the mixture, forming the mixture into a felt of preselected shape, subjecting the felt to the action of an agent comprising aqueous vapor at a temperature of at least about 150° F. and having a liquid water content of less than about 10% by weight for a time sufficient to adjust the temperature of the felt to a value of between about 150° F. and about 300° F. and the moisture content of the felt uniformly to a value of between about 10% and about 40% by weight, thereby producing a conditioned felt of controlled temperature and moisture content, and immediately consolidating the conditioned felt to a predetermined density while utilizing the heat imparted to the felt by the steam.

References Cited in the file of this patent

UNITED STATES PATENTS

| | | |
|---|---|---|
| 2,008,892 | Asplund | July 23, 1935 |
| 2,459,804 | Francis | Jan. 25, 1949 |
| 2,635,301 | Schubert et al. | Apr. 21, 1953 |
| 2,642,371 | Fahrni | June 16, 1953 |
| 2,658,847 | MacDonald | Nov. 10, 1953 |